United States Patent [19]

Hoefelmayr et al.

[11] Patent Number: 5,317,988
[45] Date of Patent: Jun. 7, 1994

[54] TEAT RUBBER

[75] Inventors: Tilman Hoefelmayr, Niederteufen, Switzerland; Jakob Maier, Türkheim, Fed. Rep. of Germany

[73] Assignee: Biomelktechnik Hoefelmayr & Co., Niederteufen, Switzerland

[21] Appl. No.: 982,239

[22] Filed: Nov. 25, 1992

Related U.S. Application Data

[63] Continuation of Ser. No. 766,454, Sep. 25, 1991, abandoned.

[30] Foreign Application Priority Data

Sep. 28, 1990 [DE] Fed. Rep. of Germany ....... 4030767

[51] Int. Cl.⁵ ................................................. A01J 5/16
[52] U.S. Cl. ................................. 119/14.47; 119/14.49
[58] Field of Search .............. 119/14.47, 14.48, 14.49, 119/14.50, 14.51, 14.52, 14.53

[56] References Cited

U.S. PATENT DOCUMENTS

| | | | |
|---|---|---|---|
| 1,955,810 | 4/1934 | Hodsdon | 119/14.49 |
| 3,079,891 | 3/1963 | Miller | 119/14.49 |
| 3,099,246 | 7/1963 | Beskow | 119/14.49 |
| 3,158,136 | 11/1964 | George | 119/14.52 |
| 3,696,790 | 10/1972 | Albright | 119/14.47 |
| 3,818,867 | 6/1974 | Strange-Hansen | 119/14.47 |
| 4,651,676 | 3/1987 | Kupres | 119/14.47 |
| 5,069,162 | 12/1991 | Thompson et al. | 119/14.47 |

FOREIGN PATENT DOCUMENTS

| | | |
|---|---|---|
| 0027210 | 4/1981 | European Pat. Off. . |
| 0043264 | 1/1982 | European Pat. Off. . |
| 1769640 | 4/1958 | Fed. Rep. of Germany . |
| 2528386 | 1/1987 | Fed. Rep. of Germany . |
| 117307 | 7/1918 | United Kingdom . |
| 1161118 | 8/1969 | United Kingdom . |

*Primary Examiner*—John G. Weiss
*Attorney, Agent, or Firm*—Flynn, Thiel, Boutell & Tanis

[57] ABSTRACT

In the case of teat rubbers consisting of a shaped tubular member, the outer side of which has formed thereon a holding rim for engaging the edge of a milking cup from above, it may very easily happen that the holding rim of the teat rubber breaks through when subjected to blows or knocks. The teat rubber will then be practically unfit for use. It is now suggested that a recess should be provided in such a teat rubber in the holding rim portion located opposite the milking cup edge portion facing outwards in the longitudinal direction, and that this recess has inserted therein a ring consisting of a material which is different from the material of the teat rubber.

9 Claims, 2 Drawing Sheets

TEAT RUBBER

This application is a continuation of U.S. Ser. No. 07/766 454, filed Sep. 25, 1991 now abandon.

FIELD OF THE INVENTION

The present invention refers to a teat rubber consisting of a shaped tubular member, the outer side of which has formed thereon a holding rim for engaging the edge of a milking cup from above.

BACKGROUND OF THE INVENTION

It is nowadays an accepted fact that a soft, flexible and stretchable rubber material, which clings to the teat, is physiologically more suitable for the milking process than respective hard rubbers. Such soft rubber materials permit a gentler massage of the teat and they cause less constrictions at the teat base. Furthermore, such rubber materials are less irritating to the tissue because they adapt themselves better to the tissue. This will also have the effect that teat rubbers consisting of such a material can also be used more universally, since they adapt themselves better to the various shapes and sizes of the teats. Finally, such teat rubbers also fulfil a better support stocking function for the teat, since, in view of the fact that they are better adapted to the teat, they provide higher friction at the skin of the teat thus preventing an undesirable ascent of the teat rubber towards the teat base.

Although teat rubbers consisting of such a soft material show a particularly large number of advantages, they have hitherto been unable to gain acceptance in everyday practice due to serious other disadvantages. An essential reason for this is to be seen in the fact that the notch toughness as well as the resistance to tearing of the rubber material in question will decrease in proportion to an increase in the softness and adaptability of the teat rubber produced from such a rubber material. The main problem arising, when such soft rubber materials are used, is that these materials are very sensitive to blows, which may be caused quite frequently in the course of the normally rough milking procedure. A part which is especially endangered in this respect is the holding rim of the teat rubber, which engages the milking cup from above. This holding rim is not primarily endangered by kicks of the cow nor by blows hitting the head of the teat rubber in the longitudinal direction of the milking cup. The actual danger is caused by knocks or blows hitting the milking cup sideways from above. That such blows occur quite frequently is due to the structural design of the milking equipment, which is constructed such that the four heavy milking cups are attached to very flexible milk collecting hoses, which have a length of approx. 18 cm, and are suspended from a collecting unit. Every slightly faster movement of the collecting unit, which may occur when the milking equipment is being removed, or when it falls off, or during transport, may result in a correspondingly fast movement of the milking cup. However, due to the fact that the milking cup is guided by the flexible milk hose on the underside thereof, blows will occur in most cases, said blows hitting the upper side of the cup sideways from above, when there is some obstacle. As far as such obstacles are concerned a large number of them exists, such as gratings with sharp edges, the concrete floor, the milking stand edge or the milking frame. If a milking cup hits such an obstacle at the side, the head of the teat rubber will swerve to the side, whereas the holding rim engaging the milking cup from above will be subjected to the full blow. This will have the effect that the holding rim, which is pretensioned to a certain degree, will break through and that small, often unnoticed holes will be formed, the injury and the subsequent breaking through taking normally place from inside. In view of the fact that a pulsating vacuum exists in the space between the teat rubber and the milking cup during the milking process, it will frequently happen that wrong air will enter this pulsation space through the holes caused by said blows, and this will result in poor pulsation. Moreover, it will often happen that, during the milking cup cleaning process, water is additionally sucked into the pulsation space through the holes caused by the above-mentioned blows, and this will have the effect that the pulsation paths will partially be blocked during the subsequent milking process and that, on the whole, a pulsation malfunction will occur, which will finally entail very serious mastitis problems. However, the teat rubbers are, in practice, removed from the milking cups only at major intervals of time so that the problems arising due to the holes caused by the above-mentioned blows will often not be noticed for a very long time.

Numerous attempts have already been made to find possibilities of preventing a breaking through of the teat rubbers at the edges of the milking cup. One possibility would be the use of a harder rubber material on the whole. This would, however, mean that precisely the advantages provided by the use of a soft teat rubber material would have to be given up. Another possibility would be the provision of a teat rubber holding rim which is designed in the form of a thicker bead so as to reduce the probability of breaking through. However, this solution would show the disadvantage that the milking cup heads would become comparatively bulky, since, in particular in the case of cows with closely spaced teats, these heads must be positioned in a very closely spaced relationship, i.e. the diameter at the head should only be comparatively small. In the case of such a solution, additional difficulties would arise, if some types of automatic washing machines were used; in the case of such automatic washing machines, the milking cup head portions are inserted into washing reception means, which produce a sealing effect on the outer side thereof and which, consequently, have a standardized internal diameter. An additional disadvantage of such a bead would become evident in the production of such teat rubbers, since the cost of materials would be increased and, in particular, since a longer vulcanization period would be required, whereby the total expenses would be increased still further.

Moreover, it has already been attempted to design the holding rim of the teat rubber in such a way that, at the location where the edge of the milking cup is positioned, a recess is provided in the holding rim so that the holding rim extends in this area at a certain distance from the milking cup edge and contacts said milking cup only at the smooth outer surface thereof. The rubber of the holding rim can thus deflect to a certain degree prior to coming into contact with the edge of the milking cup.

Furthermore, EP-B1-0 043 264 already discloses attempts to protect the head of the teat rubber against breaking through by means of a special, hard outer cap. Such protective caps can either be attached to the metal cup sleeve or they are fixedly connected thereto. In addition to their bulkiness, any type of protective cap solution shows the disadvantage that dirt will accumulate between the flexible rubber and the cap and that, in practice, it will hardly be possible to remove said dirt. This will result not only in a hygienically untolerable situation—since the process in question is a food production process—but also in the development of fungi, which will grow under the cap on dirt and moisture and which will gradually penetrate the rubber and destroy it. Hence, all types of protective caps are of no use as far as the solution of the problem of breaking through is concerned.

Similar problems arise in the case of the milking cup known from U.S. Pat. No. 4 651 676, in the case of which the teat rubber is provided with a very low head whose outer lower end has formed thereon an annular lip, which engages the upper edge of the milking cup from above. For protecting the head of the teat rubber, a protective ring or a protective cup, which fully encloses the upper head of the teat rubber, is additionally formed on the milking cup, the upper edge of said protective ring or protective cup projecting additionally beyond the upper end of the teat head.

In accordance with another attempt, damping ribs were formed on the outer side of the holding rim in the longitudinal or also in the transverse direction of the teat rubber. In addition to the fact that the desired resistance to breaking through could not be achieved by means of this ribs either, additional hygienic problems arose, since the corners of such ribs are particularly difficult to clean and proved to be dust traps.

Normally, the teat rubber holding rims are formed such that they are tensioned upon being attached to the milking cup. This tension of the holding rim will, of course, increase the risk of breaking through or tearing of the teat rubber, when said teat rubber is subjected to blows. However, if the tension is reduced—and this would be a possibility of reducing the probability of breaking through—this will entail the essentially greater disadvantage that the teat rubber as a whole will no longer reliably adhere to the milking cup, and this may result in an ingress of water into the milking cup intermediate space during the cleaning process as well as in a rotary displacement of the teat rubber, i.e. in wringing out of the teat, during the milking process. The resultant risk of mastitis would exceed by far the advantage which could be achieved by the use of a soft rubber.

In the case of teat rubbers having a very low head height, it may also happen that the holding rim breaks through, if the milking cup hits an obstacle with the teat rubber head-first or if it hits said obstacle sideways from in front. The probability of breaking through of the holding rim could be reduced in these cases by using a high, long teat rubber head whose path of deflection would be longer and whose ability to deflect would be greater. However, these heads entail the disadvantage that the teat supporting effect is not so good and that in the case of short teats the suction pipe will perhaps only take hold of the tip of the teat. This will also have the effect that the milking cup may more easily fall off the teat.

An additional possibility of reducing the risk of breaking through of the holding rim could be seen in the measure of enlarging the diameter of the teat rubber head. Upon milking cows with closely spaced teats, this, however, would entail the same problems which are also entailed by the use of thicker beads for the holding rim. In such cases, it may especially happen that independent milking out of the individual teats would no longer be possible because the individual heads would influence and impede one another.

The present invention is based on the task of preventing the breaking through of the holding rim of teat rubbers and especially the breaking through of the holding rim of teat rubbers consisting of a soft material.

In accordance with the present invention, this task is solved by the features that a recess is provided in the holding rim portion located opposite the milking cup edge portion facing outwards in the longitudinal direction, and that a ring, which consists of a material different from the material of the teat rubber, is adapted to be inserted into said recess.

This will definitely prevent a breaking through behaviour of the holding rim.

A structural design which proved to be expedient is a design in the case of which the ring has, at its side facing the milking cup edge, a structural shape which is complementary to said milking cup edge. Although this will result in an optimum distribution of forces and in an optimum absorption of the impact effect, it still possible to provide an arrangement in the case of which the ring has a shape deviating from the shape of the edge of the milking cup and in the case of which said ring abuts on the edge of said milking cup only via an additional material or via an element consisting of the material of the teat rubber.

The advantages which can be achieved can be improved still further by providing the feature that, at its side facing away from the milking cup edge, the ring is provided with an area having, in comparison with the radius of curvature of said milking cup edge, a larger radius of curvature.

Independently of the shape of the ring, it will be particularly advantageous to choose for the ring a material, which is hard in comparison with the material of the teat rubber and which is slightly flexible.

A substantial increase in the resistance to breaking through can also be achieved, when the ring consists of a soft material having, in comparison with the notch toughness of the teat rubber material, a higher notch toughness.

In particular in cases in which the ring was formed into the holding rim, good results were achieved, when the ring consisted of spring steel, plastic material, hard rubber or textile material.

Plastic materials which proved to be particularly suitable for producing the ring are polyamide, polyethylene, polypropylene, polyester, polyurethane or polyvinyl chloride.

The greatest improvements were achieved in cases in which a teat rubber consisting of silicone rubber was used. On the basis of this improvement, it is now finally possible to take into account an unlimited use of silicone rubber in practical everyday processes.

BRIEF DESCRIPTION OF THE DRAWINGS

In the following, the present invention will be explained on the basis of embodiments shown in the drawing, in which.

DETAILED DESCRIPTION

Figure 1:
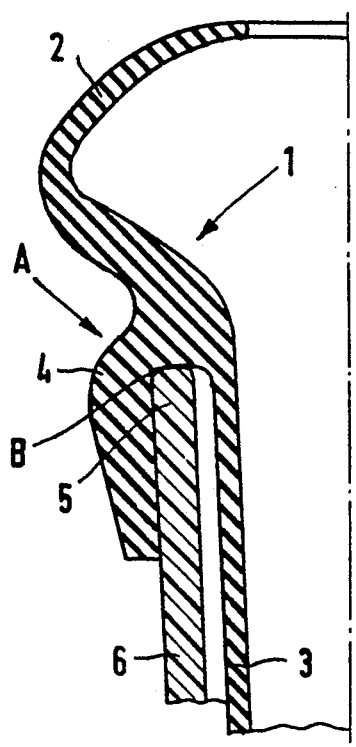
FIG. 1 shows a half-side section through a teat rubber holding rim on a milking cup, of the type which has been normally used up to now.

FIG. 1 shows a tubular teat rubber, which is identified as a whole by the reference number 1, and which comprises a head 2, a suction pipe 3 and a holding rim 4 formed on the outer side of said teat rubber. The holding rim 4 engages from above the free edge 5 of a milking cup sleeve 6. The arrangement shows a known teat rubber. Such teat rubbers show the disadvantage that in the case of blows hitting the teat rubber from the side, e.g. from the direction of arrow A shown in the drawing, the holding rim 4 will break through at point B.

Figure 2:
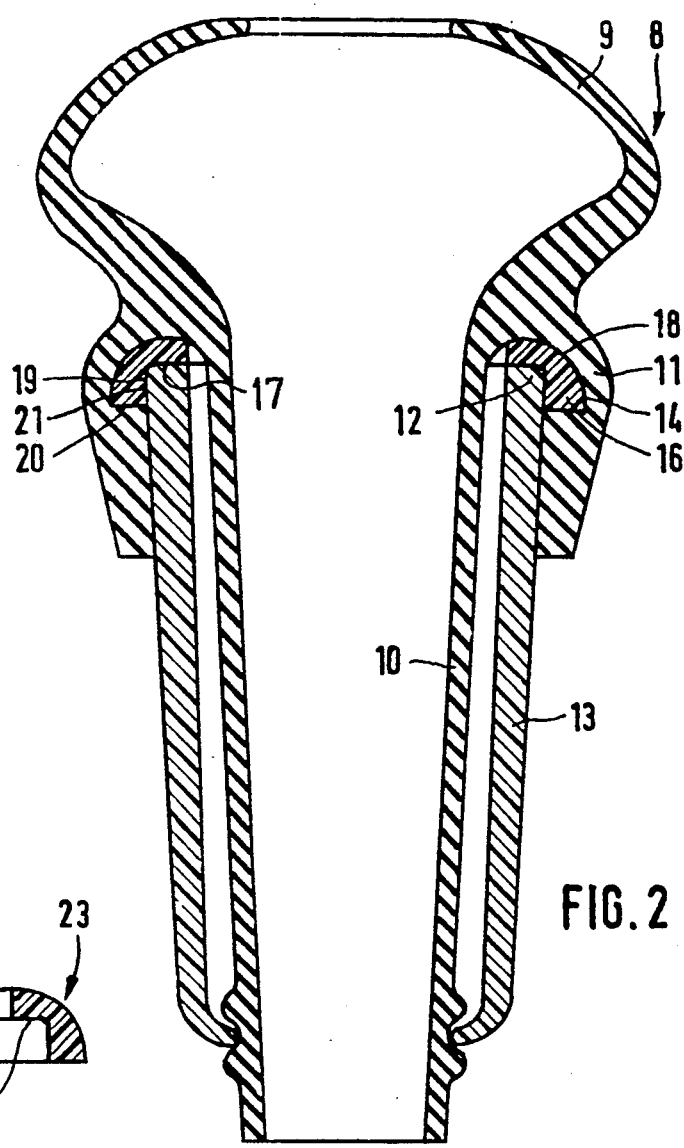
FIG. 2 shows a section through a teat rubber plus milking cup according to a first embodiment of the present invention.
Figure 3:
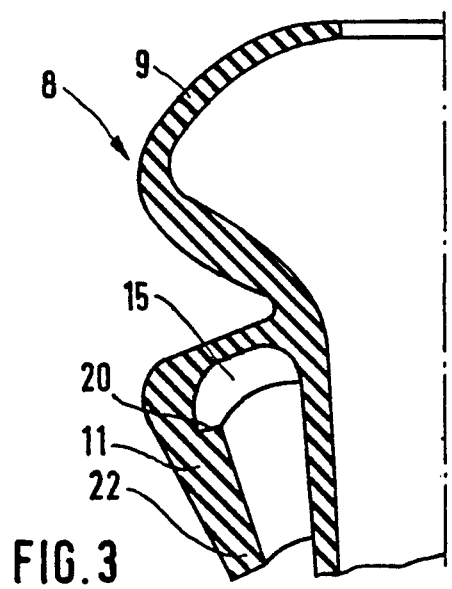
FIG. 3 shows a representation of part of the teat rubber according to FIG. 2 in the relaxed condition without any milking cup and without any breakthrough protection ring.

FIG. 2 shows a teat rubber, which is as a whole identified by the reference number 8, and which comprises a head 9, a suction pipe 10 as well as an integrally cast annular holding rim 11. The holding rim 11 engages from above the free edge 12 of a milking cup sleeve 13. In the case of this embodiment of the invention, the portion 14 of the holding rim 11, which is located opposite the outwardly facing portion of the edge 12 of the milking cup sleeve 13, has provided therein a recess 15, which can be seen most clearly in FIG. 3, where the same teat rubber is shown without the milking cup sleeve. This recess 15 has inserted therein a ring 16, whose inner side 17 is adapted or conformed to the external shape of the outwardly facing edge 12 of the milking cup sleeve 13. The structural design of the outer side 18 of the ring 16 is of such a nature that the outer surface thereof has at any point thereof a radius of curvature which is essentially larger than the radius of curvature of the edge 12 of the milking cup sleeve 13. The ring 16 extends essentially only over the outwardly facing portion of the edge of the milking cup sleeve, i.e. it covers the axially extending part of the milking cup sleeve up to a point slightly below the rounded portion of the milking cup sleeve on the outer side of said milking cup sleeve.

The ring 16 consists of a separate part, which is independent of the teat rubber 8, and, consequently, it can be formed independently of said teat rubber. The area of the recess 15 above the smooth-edge portion 19 of the milking cup sleeve 13 is constructed in the form of an angle-section recess 20 so that the ring can more easily be inserted and held in the teat rubber. A kind of edge-shaped recess is thus formed, and the edge 21 of the ring 16 can be brought into locking engagement with said edge-shaped recess.

Due to the fact that the holding rim 11 has provided therein a recess 15 corresponding to the ring 16 with regard to shape as well as volume, no additional tension will be generated in the portion of the holding rim 11 which extends on top of the ring 16, when the ring 16 is inserted and when the teat rubber is installed on the milking cup sleeve. Tension will essentially occur in portion 22 (cf. FIG. 3), since this portion has been preformed in an adequate manner (i.e. it has, in its relaxed condition, an inner diameter which is smaller than the outer diameter of the milking cup sleeve 13).

In cases in which a teat rubber consisting of silicone rubber was used, which can have a typical hardness between 35 and 50 Shore A and which shows high elasticity in combination with little notch toughness, a ring 16 consisting of a normal rubber with a hardness of from approx. 60 to 90 Shore A was used with good success. In accordance with another embodiment, the ring 16 was made of a soft polyethylene (hardness approx. Shore D 43) with high notch toughness. However, good results were also obtained on the basis of a ring 16, which consisted of a polyamide (PA 6).

Although it is possible to use harder materials as well as softer materials having a good notch toughness, the rings used were preferably rings, which consisted of a material having a hardness between the hardness of unreinforced polyamide and that of hard rubber.

Rings consisting of polyamide, polyethylene and polypropylene can be produced at a particularly fair price, since, being socalled waste products, these plastic materials are very moderate in price.

If teat rubbers consisting of silicone rubber are used, it will be necessary to take care that the ring consists of a microbe-resistant plastic material. In particular in cases in which polyurethane materials are used, special attention should be paid to this demand.

Figure 4:
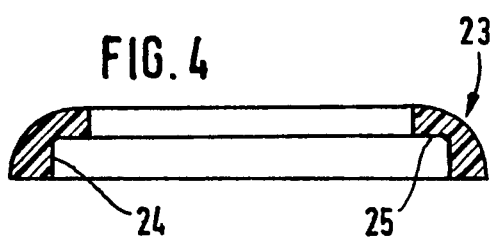
FIG. 4 shows a section through a break-through protection ring along the line IV—IV in FIG. 5.
Figure 5:
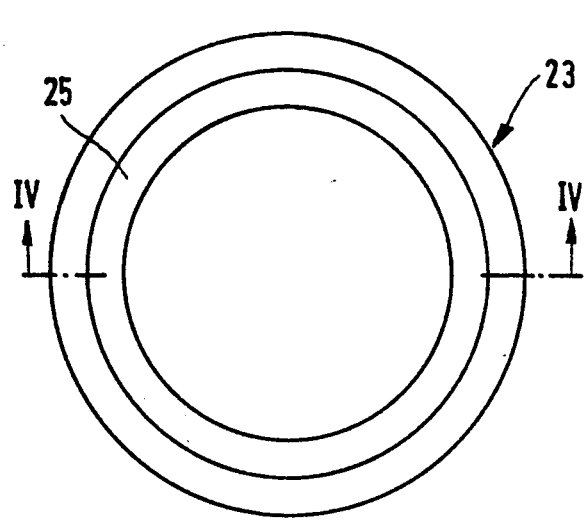
FIG. 5 shows a view from below of the ring shown in FIG. 4.

In FIG. 4 and 5, a ring 23 is shown, which is similar to the ring 16 shown in FIG. 2. Other than the ring 16, which is attached to a milking cup sleeve 13 whose edge 12 is rounded itself, the ring 23 is intended to be attached to a right-angled edge. This is the reason for the fact that the inner side of the ring is formed with radially inwardly and axially facing areas 24 and 25, respectively, which constitute smooth areas extending at an angle of 90° relative to each other. In view of the fact that most milking cups are provided with such an angled edge, ring 23 is the ring which will be used most frequently.

Figure 6:
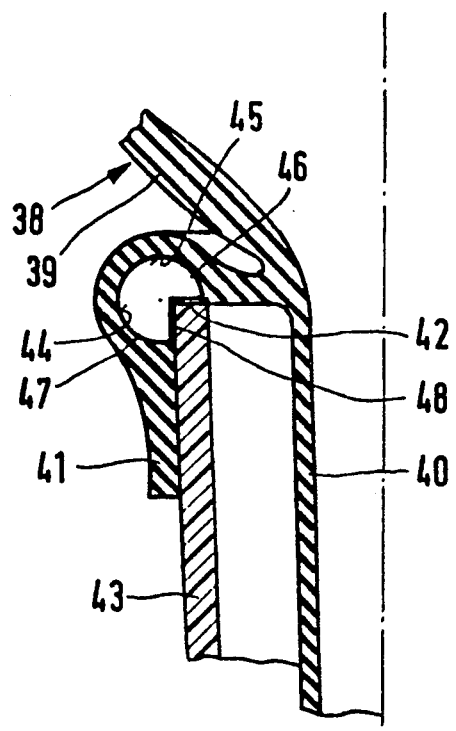
FIG. 6 shows a fragmentary view of an additional embodiment of a teat rubber according to the present invention held on a milking cup.

FIG. 6 shows a different embodiment of a teat rubber according to the present invention. The teat rubber, which is identified as a whole by the reference number 38, also comprises a head 39, only part of which is shown, a suction pipe 40 as well as a holding rim 41 engaging from above the edge 42 of a milking cup sleeve 43. In the case of this embodiment, a ring 44 is provided, which can have approximately the shape of the ring 23 in FIG. 4. However, the ring 44 can also be provided with a circular cross-section from which a square notch is cut out. The area 45 facing away from the edge 42 has a radius of curvature which is substantially larger than the radius of curvature of the outwardly facing edge of edge 42. The shape of the ring is of such a nature that one portion 46 is located above the upwardly (in FIG. 6) facing edge of edge 42, whereas another portion 47 is located at the side of the outwardly facing lateral wall of the milking cup sleeve 43. It is, however, also possible to cast the ring 44 directly into the holding rim 41. In this case, a layer 48 consisting of the material of the teat rubber is additionally positioned between the edge 42 and the ring 44. This will not impair the resistance to breaking through. The materials which may be used for the ring are spring steel as well as some plastic material or rubber or also a textile material.

Figure 7:
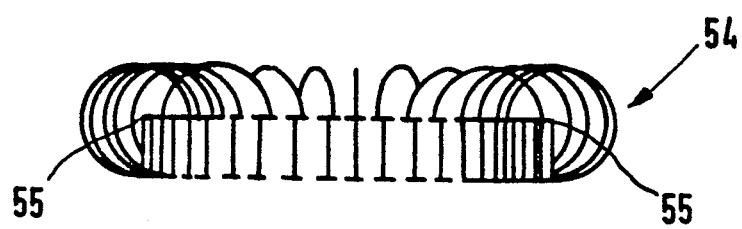
FIG. 7 shows a section through a ring consisting of a coiled steel wire.

In FIG. 7 an additional embodiment of a ring 54 is shown, which can—in accordance with ring 44—be inserted into a complementary recess of the teat rubber or which can directly be cast integrally into the holding rim of a teat rubber. The ring 54 itself consists of a wire spiral having an essentially circular cross-section, said wire spiral being subsequently notched along the line 55 in such a way that each wire turn describes the outline of an area formed by cutting one quarter out of a circular disc.

We claim:

1. A milking assembly adapted to fit on a teat milk cow, comprising:
    a teat rubber having a shaped tubular member which includes an axially extending suction pipe portion, an outer side of said tubular member having formed thereon a holding rim portion, said holding rim portion coaxially overlapping said suction pipe portion, being attached at one end to said suction pipe portion, and being spaced radially outwardly of said suction pipe portion so as to define a space therebetween, said space opening axially outwardly at the other end of said holding rim portion;
    means defining an enlarged recess in said holding rim portion opening into said space; and
    means defining a ring separate from said tubular member and being received in said enlarged recess, said ring having on its side remote from the said recess a surface with axially facing and radially inwardly facing surface portions, said axially facing surface portion facing toward said open other end of said holding rim portion, said ring having on its side thereof directed into the said recess an area with a radius of curvature that is larger than on the surface of the ring remote from said recess so that blows to an external surface area of a portion of said holding rim portion adjacent said ring will be distributed over said area of said ring with the larger radius of curvature to thereby prevent the portion of said holding rim portion between the external surface area of said holding rim portion whereat the blow occurred and said space from being punctured as a result of said blow, said ring consisting of a material different from the material of said teat rubber.

2. The milking assembly according to claim 1, wherein said ring consists of a material which is hard in comparison with the material of said teat rubber and is flexible.

3. The milking assembly according to claim 1, wherein said ring consists of a soft material having, in comparison with the notch toughness of said teat rubber material, a higher notch toughness.

4. The milking assembly according to claim 1, wherein said ring consists of at least one of a spring steel, plastic, rubber and textile material.

5. The according to claim 4, wherein said ring consists of at least one of a polyamide, polyethylene, polypropylene, polyester, polyurethane and polyvinyl chloride.

6. The milking assembly according to claim 1, wherein said teat rubber consists of a silicone rubber.

7. The milking assembly according to claim 1, wherein said ring is removably insertable into said teat rubber, and wherein said holding rim portion encircles and is coupled to said ring.

8. The milking assembly according to claim 1, wherein a milking cup is provided having an elongated and hollow sleeve into which is received said suction pipe portion, said milking cup having at one end thereof an axially facing surface portion and a radially outwardly facing surface portion received in said space and engaging said surface portions of the surface on said ring remote from said recess.

9. The milking assembly according to claim 8, wherein said ring at a side thereof facing said space has a structural shape which conforms to said axially facing surface portion and said radially outwardly facing surface portion of said milking cup.

* * * * *

UNITED STATES PATENT AND TRADEMARK OFFICE
CERTIFICATE OF CORRECTION

PATENT NO. : 5 317 988
DATED : June 7, 1994
INVENTOR(S) : Tilman HOEFELMAYR

It is certified that error appears in the above-indentified patent and that said Letters Patent is hereby corrected as shown below:

Column 7, line 12; change "on a teat milk" to
---on a teat of a milk---.

Signed and Sealed this

Eighteenth Day of October, 1994

Attest:

BRUCE LEHMAN

Attesting Officer

Commissioner of Patents and Trademarks